United States Patent [19]

McIntyre

[11] Patent Number: 5,484,161
[45] Date of Patent: Jan. 16, 1996

[54] ADJUSTABLE MOUNTING FOR SUSPENSION STRUT

[76] Inventor: Kevin J. McIntyre, 138 Oxford Street, Woollahra NSW 2025, Australia

[21] Appl. No.: 167,940
[22] PCT Filed: Jun. 22, 1992
[86] PCT No.: PCT/AU92/00303
   § 371 Date: Dec. 21, 1993
   § 102(e) Date: Dec. 21, 1993
[87] PCT Pub. No.: WO93/00244
   PCT Pub. Date: Jan. 7, 1993

[30] Foreign Application Priority Data

Jun. 21, 1991 [AU] Australia ................. PK6806

[51] Int. Cl.⁶ ............................................. B62D 17/00
[52] U.S. Cl. ................................. 280/661; 267/220
[58] Field of Search .......................... 280/668, 661, 280/660; 267/220; 188/321.11

[56] References Cited

U.S. PATENT DOCUMENTS

| | | | |
|---|---|---|---|
| 3,549,167 | 12/1970 | Haverbeck | 280/674 |
| 4,213,631 | 7/1980 | Wilkerson | 280/661 |
| 4,372,575 | 2/1983 | Hyma | 280/661 |
| 4,581,802 | 4/1986 | Castoe | 29/402.19 |
| 4,817,984 | 4/1989 | Ferman et al. | 280/661 |
| 4,867,473 | 9/1989 | Jordan | 280/661 |
| 4,909,642 | 3/1990 | Hoermandinger | 384/536 |
| 4,921,271 | 5/1990 | Berry et al. | 280/661 |

Primary Examiner—Margaret A. Focarino
Assistant Examiner—Paul N. Dickson
Attorney, Agent, or Firm—Davis, Bujold & Streck

[57] ABSTRACT

An adjustable mount for the upper end of a motor vehicle suspension strut located in a bush (12) wherein a flange (22) is located between a clamping plate (13) and a face plate (14) with studs (17) passing from the clamping plate through enlarged apertures (15) in the flange (22), holes (16) in the face plate (14) and aligned holes (18) in the top of the vehicle chassis suspension tower (11), and being secured by nuts (19). Before the nuts (19) are tightened, the flange (22) may be moved in a sliding fashion between the clamping plate (13) and face plate (14) to locate the bush (12) and upper end of the strut into the desired location for correct castor and camber settings. Reference is also made to the provision of screwdriver slots (25) to permit the flange (22) to be levered into the desired location using a screwdriver when the suspension is under load.

7 Claims, 4 Drawing Sheets

ADJUSTABLE MOUNTING FOR SUSPENSION STRUT

This invention relates to adjustable automotive suspension components and has been devised as an adjustable mount for the upper end of a vehicle suspension strut, particularly although not limited to a mount for the upper ends of McPherson-type struts used in the front suspension of motor vehicles.

BACKGROUND ART

Strut-type suspension is well known in motor vehicles wherein a telescopic strut normally incorporating an hydraulic damper is used as one locating member for a motor vehicle wheel. The most common form of strut suspension is the so-called McPherson strut where the suspension spring is located concentrically around the telescopic strut which has an upper mounting point to the vehicle chassis in a tower located above the front wheel arch and protruding into the engine bay of the motor vehicle. The lower end of the strut is typically further located by a transverse link and a fore and aft or drag link.

The wheel alignment of a motor vehicle, and particularly the front wheel alignment is important to the safe handling of the vehicle and to preventing wear on the tires. There are many times in the life of a vehicle when it is necessary or desirable to adjust the castor and camber of a motor vehicle wheel either due to normal wear and tear or to some form of minor damage such as the striking of kerbs or other obstacles. On many motor vehicles fitted with McPherson strut suspensions, this adjustment is often difficult to perform as the motor vehicle manufacturer provides little or no mechanism for relocating the upper end of the strut where it mounts into the vehicle chassis. It is often necessary to relocate the mounting point of the upper end of the strut to achieve the desired castor and camber settings.

It is common for the upper end of a McPherson strut to be secured to the chassis member by way of three vertical studs located on a pitch circle and passing from a flange at the upper end of the strut through aligned holes in the vehicle chassis member. Some manufacturers have provided a degree of adjustment by locating the axis of the strut off-center from the pitch circle of the studs so that disengaging the studs from the holes in the vehicle chassis member, rotating the strut and re-engaging the studs through the holes will relocate the axis of the strut relative to the vehicle chassis member. This is however an extremely coarse adjustment which only permits the top end of the strut to be located in three defined positions. Furthermore, if it is required to alter the camber of the suspension without affecting the castor (or visa versa), this adjustment is not possible using the mounting described above.

DISCLOSURE OF THE INVENTION

The present invention therefore provides an adjustable mount for the upper end of a vehicle suspension strut allowing the strut to be relocated relative to a vehicle chassis member, said mount comprising a bush adapted to receive and secure the upper end of the strut, a flange extending radially outwardly from an upper part of the bush and having upper and lower faces, a clamping plate adapted to abut the lower face of the flange and having an opening therethrough larger than the perimeter of the bush such that the clamping plate can slide over the lower face of the flange over a limited area, and a plurality of studs extending upwardly from the clamping plate through apertures in the flange, each said aperture being significantly larger than the diameter of the stud passing therethrough in directions both radial and circumferential to the axis of the strut, permitting sliding movement of the flange relative to the clamping plate.

Preferably the apertures are at least twice as large as the diameter of the studs in directions both radial and circumferential to the axis of the strut.

Preferably a face plate is provided abutting the upper face of the flange, said studs passing through aligned holes in the face plate.

Preferably the flange is provided with slots orientated circumferentially relative to the bush, said slots being sized to receive the end of a screwdriver blade and being located such that a screwdriver engaged with a selected one the slots when the mount is installed in a vehicle can be used as a lever bearing against an edge of the vehicle chassis member to lever the flange and bush into a desired position relative to the clamping plate and vehicle chassis member.

BRIEF DESCRIPTION OF DRAWINGS

Notwithstanding any other forms that may fall within its scope, one preferred form of the invention will now be described by way of example only with reference to the accompanying drawings in which.

MODES FOR CARRYING OUT THE INVENTION

Figure 1:
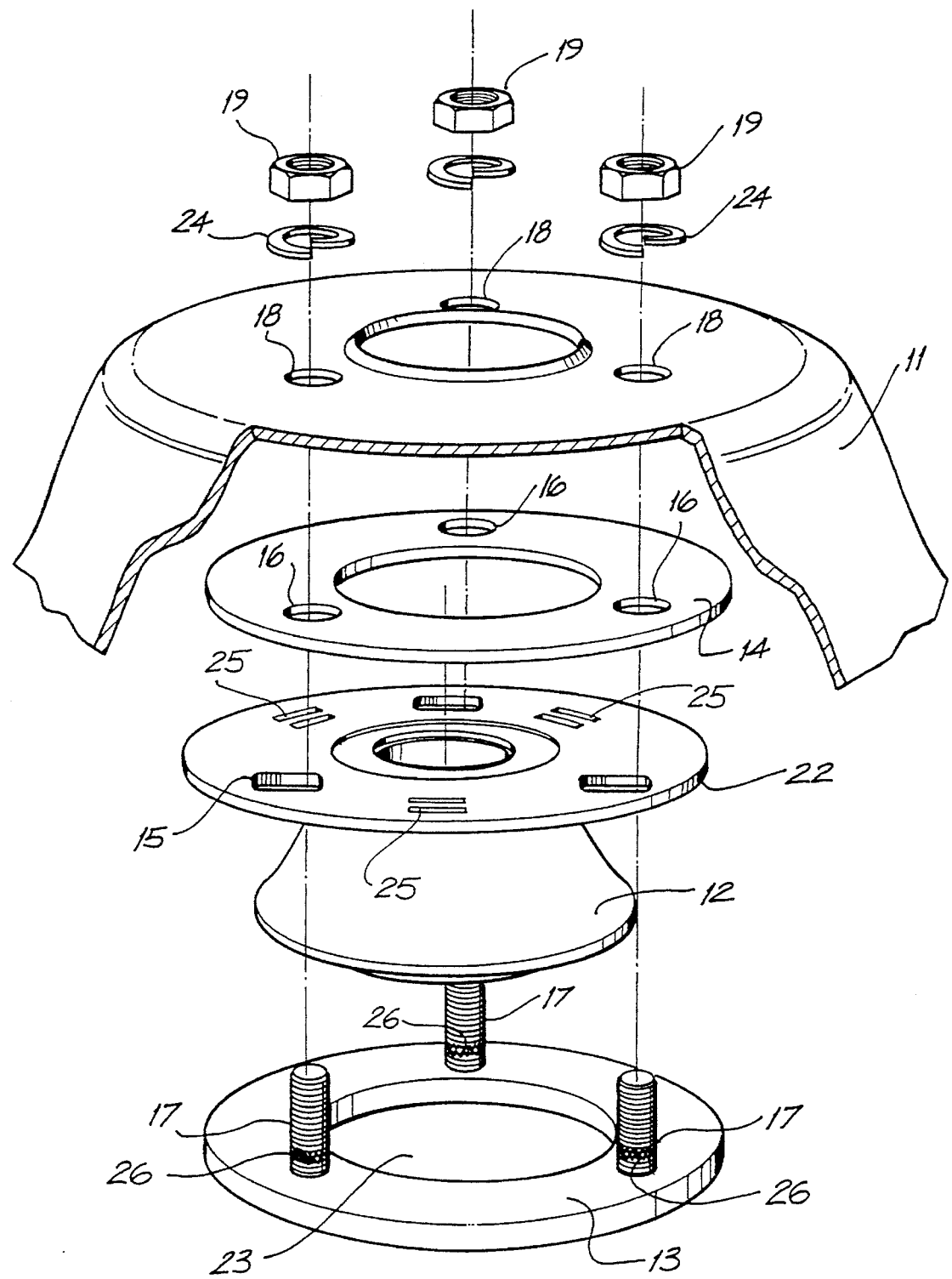
FIG. 1 is an exploded perspective view of an adjustable mount for the upper end of a vehicle suspension strut according to the invention.

The upper end of a telescopic strut suspension member of a motor vehicle is typically secured to a chassis member (11) which may be the top of a pressed metal "tower" having a hole through the center of the tower aligned with the axis of the strut. The mount for the upper end of the strut typically comprises a circular flange (1) (FIG. 4) from which protrude a plurality of equispaced studs (2) and in which is mounted an elastomeric bush (3) having an outer casing as part of the flange (1) and an inner casing (4). The upper end of the strut (6) is secured in the inner casing (4) by way of a bearing (9) held in place by a nut (8) engaged with a thread (7) on the upper end of the strut.

Typically the strut incorporates a coaxial helical spring (10) through which the weight of the motor vehicle is taken on the elastomeric bush (3).

The mount is secured to a chassis member (11) by passing the studs (2) through aligned holes in the chassis member and securing them in place with nuts (5).

Figure 2:
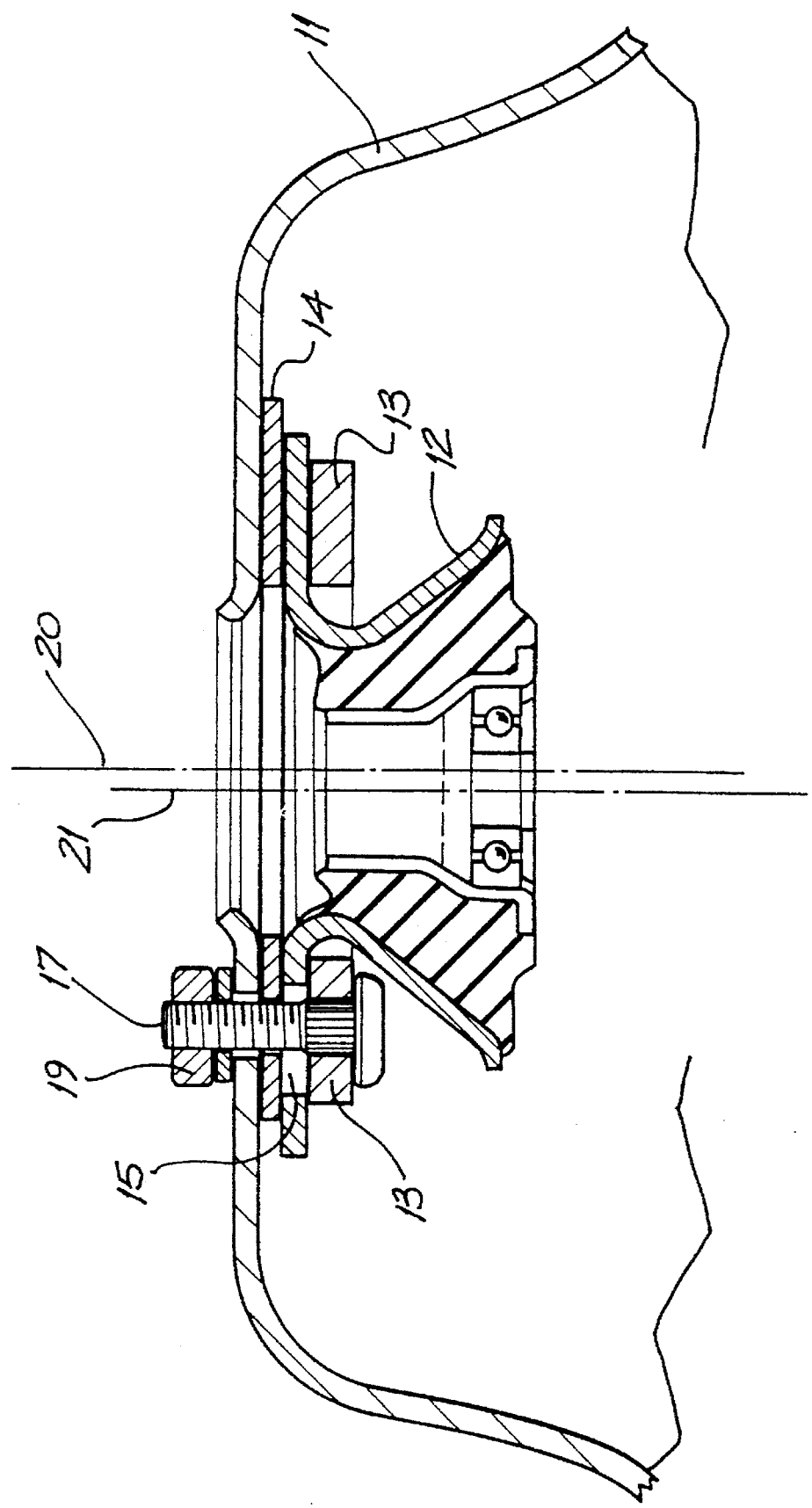
FIG. 2 is a cross-sectional elevation through the adjustable mount shown in FIG. 1, located in place in a vehicle chassis member.
Figure 3:
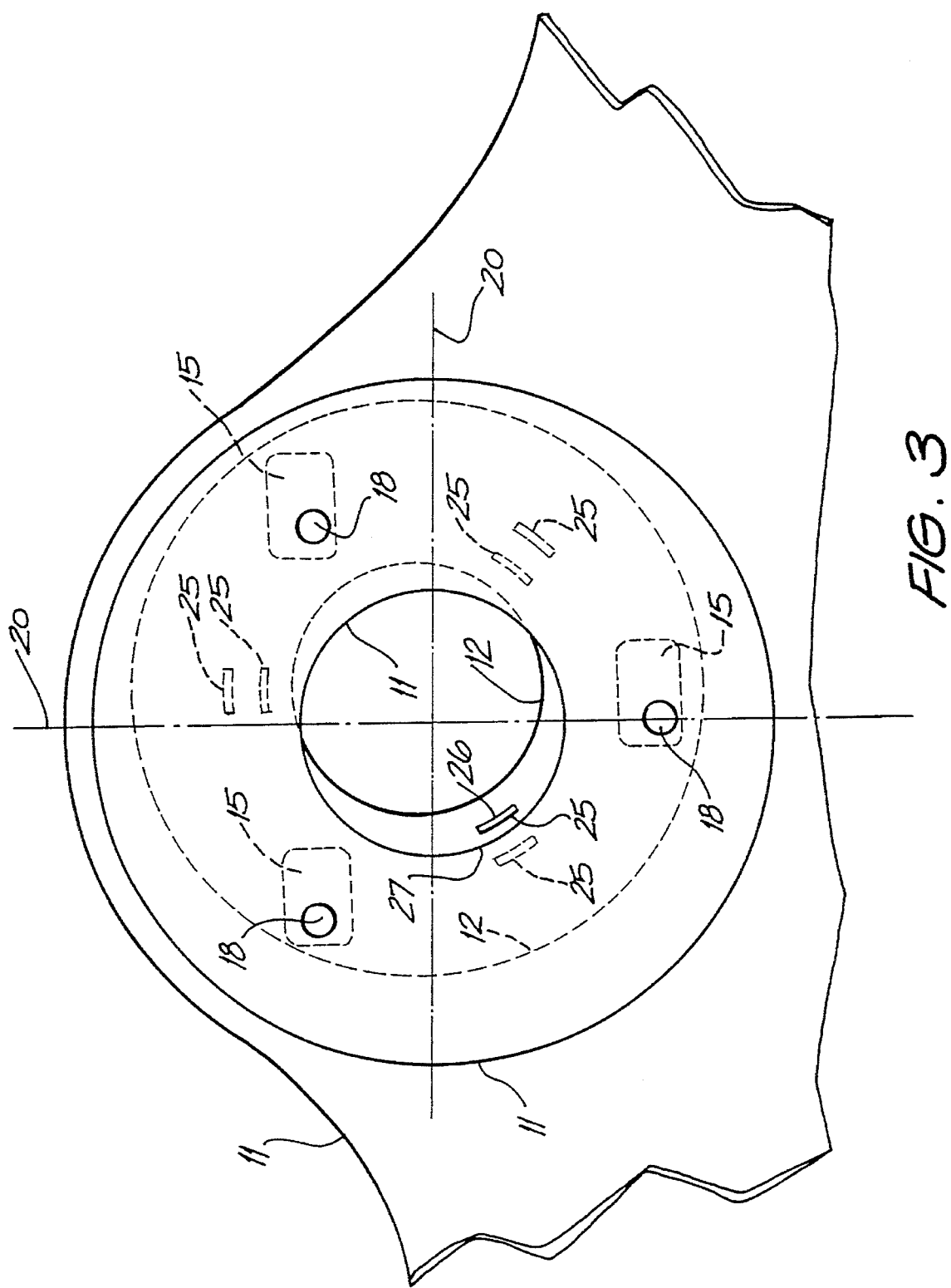
FIG. 3 is a diagrammatic plan view of the top of a strut suspension tower in a motor vehicle showing parts of the adjustable mount in place.
Figure 4:
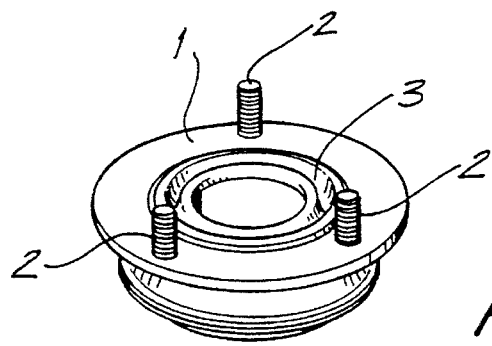
FIG. 4 is a perspective view of a prior art mount for the upper end of a vehicle suspension strut.
Figure 5:
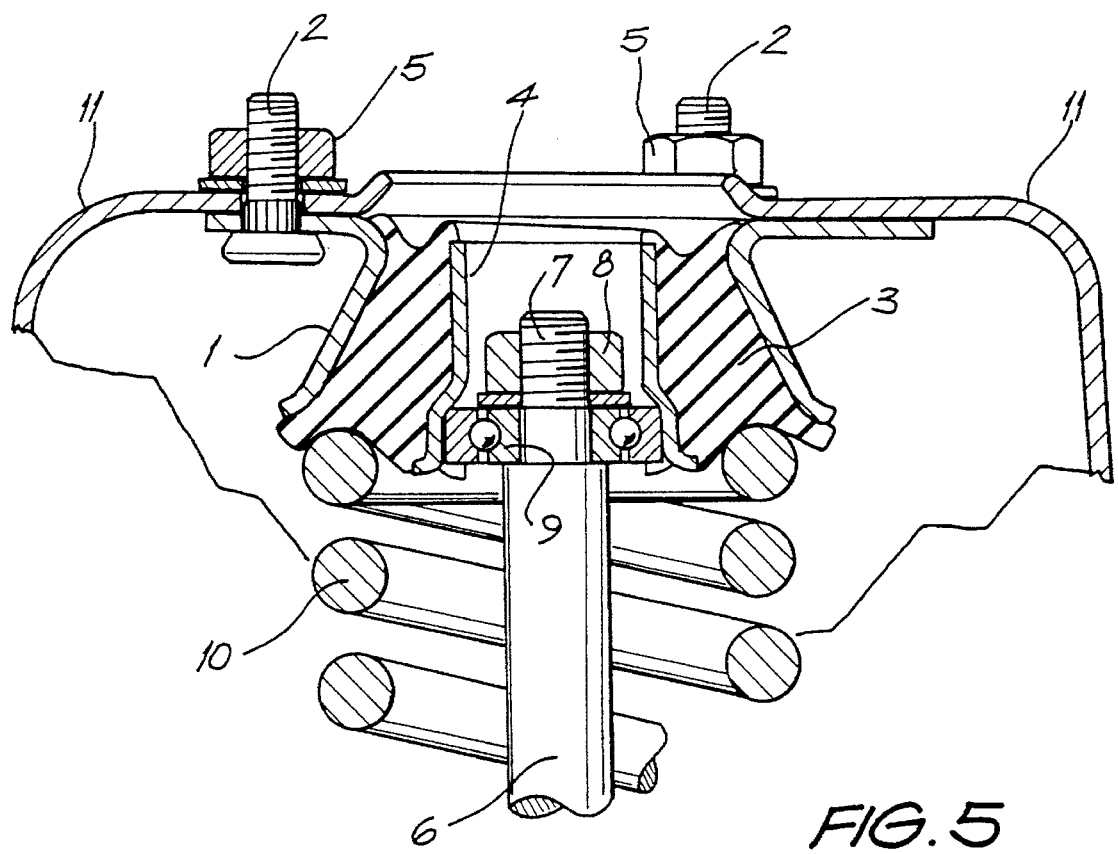
FIG. 5 is a cross-sectional elevation of the prior art mount shown in FIG. 4, in place in a motor vehicle.

In the adjustable suspension mount according to the invention the mount shown in FIG. 4 is replaced by an adjustable mount shown in FIGS. 1, 2 and 3 which permits the location of the upper end of the strut to be varied relative to the vehicle chassis member (11).

The adjustable mount according to the invention comprises an elastomeric bush (12) similar to the bush of the prior art mount having a flange (22) extending radially outwardly from the upper part of the bush (12).

The mount is provided with a clamping plate (13) adapted to abut the lower face of the flange (22) and having an opening (23) therethrough larger than the perimeter of the bush (12) (in the vicinity of the clamping plate) so that the clamping plate can slide over the lower face of the flange (22) over a limited area. The clamping plate is further provided with threaded studs (17) extending upwardly from the clamping plate and preferably equispaced on a pitch circle. The studs pass through apertures (15) in the flange (22), each aperture being significantly larger than the diameter of each stud in both radial and circumferential dimensions relative to the axis of the strut. To allow a reasonable amount of adjustment, the apertures should be at least twice as large as the diameter of the studs in directions both radial and circumferential to the axis of the strut. The apertures (15) may be any desired shape, eg: circular but in the preferred form of the invention are approximately square or rectangular in shape with rounded corners as can be clearly seen in FIG. 3.

Although it is not essential to the invention, in the preferred form the studs then pass through aligned holes (16) in a face plate (14) which is free to slide over the upper surface of the flange (22) so that the flange is loosely sandwiched between the upper face of the clamping plate (13) and the lower face of the face plate (14). In order to retain the face plate and the clamping plate on the bush and flange, retaining means may be provided to loosely secure the face plate to the studs. The retaining means may take any suitable form but typically comprise knurling or otherwise deforming the threads of the studs as shown at 26 immediately above the location of the face plate once the clamping plate and face plate have been assembled on the flange (22).

The adjustable mount is assembled into the motor vehicle by passing the studs (17) through aligned mounting holes (18) in the vehicle chassis member (11) and securing the mount to the chassis member by engaging nuts (19) ,(preferably over split washers (24) ) with the upper ends of the studs (17).

With the nuts (19) loosely engaged on the studs (17), the flange (22) and hence the mounting bush (12) is free to slide between the face plate (14) and the clamping plate (13) in any desired direction governed by the size and shape of the apertures (15) in the flange (22). It is therefore possible to position the upper end of the strut in the required location to achieve the desired castor and camber settings before tightening the nuts (19) to secure the upper end of the strut in that desired location.

To assist the movement of the flange (22) to the desired location, the flange may be provided with a plurality of slots (25) orientated circumferentially relative to the bush (12) and preferably located on concentric pitched circles about the bush (12) as can be clearly seen in FIG. 3.

Each slot is sized to receive the end of a screwdriver blade so that when the blade end is engaged in a selected slot (eg: slot 26) the screwdriver may be used as a lever bearing against the adjacent edge (27) of the vehicle chassis member (11) to lever the flange and bush into the desired position. Using this method it has been found that it is possible to relocate the flange and bush to a desired location even when the weight of a vehicle with a heavy engine is fully upon the front suspension members. This is highly desirable as the geometry of the suspension changes when the weight of the vehicle is removed from the suspension and it is therefore far more accurate to adjust and locate the suspension members when the weight of a vehicle is fully on the suspension.

The procedure referred to above is performed while the nuts (19) are loosened, and when the flange (22) has been levered to the desired position for accurate wheel alignment, the nuts (19) are tightened to a predetermined torque setting to secure and locate the upper end of the strut suspension.

By using this method of adjustment the axis (21) (FIG. 2) of the strut may be positioned to any desired location within a predetermined area, eg: to a position offset from the center (20) of the pitch circle of the holes (18). The castor and camber settings may be independently adjusted on the motor vehicle by suitable front-to-back or side-to-side movements of the upper end of the strut.

As a further preferred feature of the invention a reinforcing plate (not shown) may be interposed between the top of the chassis member (11) and the underside of the nuts and washers (19,24). The reinforcing plate typically takes the form of a flat ring having holes therethrough aligned with the holes (18). The areas surrounding the stud holes in the reinforcing plate may be further reinforced with thick plate over the areas which overlap with the apertures (15) in the flange (22) so as to resist bending of the chassis member (11) in the vicinity of the holes (18) under the load imposed by tightening the nuts (19).

I claim:

1. An adjustable mount for the upper end of a vehicle suspension strut allowing the strut to be relocated relative to a vehicle chassis member, said mount comprising a bush adapted to receive and secure the upper end of the strut, a flange extending radially outwardly from an upper part of the bush and having upper and lower faces, a clamping plate adapted to abut the lower face of the flange and having an opening therethrough larger than the perimeter of the bush such that the clamping plate can slide over the lower face of the flange over a limited area, and a plurality of studs extending upwardly from the clamping plate through apertures in the flange, each said aperture being at least twice as large as the diameter of the stud passing therethrough in directions both radial and circumferential to the axis of the strut, permitting sliding movement of the flange relative to the clamping plate.

2. An adjustable mount as claimed in claim 1 wherein the clamping plate comprises a ring and wherein the studs are located equidistantly around the ring, aligned to engage with corresponding mounting holes in the vehicle chassis member.

3. An adjustable mount as claimed in claim 1 wherein a face plate is provided abutting the upper face of the flange, said studs passing through aligned holes in the face plate.

4. An adjustable mount as claimed in claim 3 wherein retaining means are provided to loosely secure the face plate to the studs permitting the flange to slide freely between the clamping plate and the face plate.

5. An adjustable mount as claimed in claim 1 wherein the flange is provided with slots orientated circumferentially relative to the bush, said slots being sized to receive the end of a screwdriver blade and being located such that a screwdriver engaged with a selected one of the slots when the mount is installed in a vehicle by engaging the studs through aligned holes in the vehicle chassis member can be used as a lever bearing against an edge of the vehicle chassis member to lever the flange and bush into a desired position relative to the clamping plate and vehicle chassis member.

6. An adjustable mount as claimed in claim 5 wherein the slots are located on at least one pitch circle concentric with the bush.

7. An adjustable mount as claimed in claim 6 wherein two rows of slots are provided located on concentric pitch circles.

* * * * *